(12) United States Patent
Gray

(10) Patent No.: US 12,319,410 B2
(45) Date of Patent: Jun. 3, 2025

(54) UNMANNED AIRCRAFT PAYLOAD SYSTEM AND METHOD

(71) Applicant: AVIDRONE AEROSPACE INCORPORATED, Breslau (CA)

(72) Inventor: Scott Gray, Breslau (CA)

(73) Assignee: Avidrone Aerospace Incorporated, Breslau (CA)

( * ) Notice: Subject to any disclaimer, the term of this patent is extended or adjusted under 35 U.S.C. 154(b) by 0 days.

(21) Appl. No.: 18/269,382

(22) PCT Filed: Dec. 23, 2021

(86) PCT No.: PCT/IB2021/062270
§ 371 (c)(1),
(2) Date: Jun. 23, 2023

(87) PCT Pub. No.: WO2022/137202
PCT Pub. Date: Jun. 30, 2022

(65) Prior Publication Data
US 2024/0067336 A1    Feb. 29, 2024

Related U.S. Application Data

(60) Provisional application No. 63/130,481, filed on Dec. 24, 2020.

(51) Int. Cl.
*B64D 1/12*        (2006.01)
*B64D 1/22*        (2006.01)
(Continued)

(52) U.S. Cl.
CPC ............... *B64D 1/12* (2013.01); *B64D 1/22* (2013.01); *B64U 10/00* (2023.01);
(Continued)

(58) Field of Classification Search
CPC . B64D 1/12; B64D 1/22; B64D 17/78; B64D 1/00; B64D 9/00; B64U 10/00; B64U 2101/60; B64U 2101/64; B64U 2101/69
See application file for complete search history.

(56) References Cited

U.S. PATENT DOCUMENTS 2,868,580 A * 1/1959 Stevens .................. B66C 1/34
                                                      89/1.51
3,401,974 A * 9/1968 Martelee ................ B66C 1/30
                                                       294/203
(Continued)

FOREIGN PATENT DOCUMENTS

CN        106741949 A  *  5/2017  ............. B64D 1/12
CN        112758330 A      5/2021
(Continued)

OTHER PUBLICATIONS

International Search Report and Written Opinion from corresponding PCT International Application No. PCT/IB2021/062270 dated Mar. 16, 2022.

*Primary Examiner* — Assres H Woldemaryam
(74) *Attorney, Agent, or Firm* — DLA Piper LLP (US)

(57) ABSTRACT

This disclosure is directed to a payload attachment and payload management and control device for an unmanned aircraft for supporting a payload having a payload handle, the payload attachment device. The payload attachment device including a receiver for receiving the payload handle and a releasable latch in the receiver having an engaged position and disengaged position, the latched biased to the engaged position restraining a payload handle. The payload attachment device includes a manual release connected to the latch for overcoming the bias and moving the cam to the disengaged position and an automated release connected to the latch for overcoming the bias and moving the cam to the disengaged position, the automated release connected to a (Continued)

controller of the unmanned aircraft. The payload attachment device may also receive payload telemetry data and electrical power from the payload using a disconnectable electrical communication connection.

7 Claims, 17 Drawing Sheets

(51) Int. Cl.
    *B64U 10/00*     (2023.01)
    *B64U 101/60*     (2023.01)
    *B64U 101/64*     (2023.01)
    *B64U 101/69*     (2023.01)

(52) U.S. Cl.
    CPC ...... *B64U 2101/60* (2023.01); *B64U 2101/64* (2023.01); *B64U 2101/69* (2023.01)

(56) References Cited

U.S. PATENT DOCUMENTS

| | | | | |
|---|---|---|---|---|
| 3,504,406 A | * | 4/1970 | Schott | E05B 65/00 |
| | | | | 294/82.26 |
| 3,695,671 A | * | 10/1972 | Fishel | B66C 3/16 |
| | | | | 414/626 |
| 3,845,978 A | * | 11/1974 | Huber | B66C 1/36 |
| | | | | 294/82.3 |
| 3,957,233 A | * | 5/1976 | Adams | B64D 1/22 |
| | | | | 244/137.1 |
| 3,957,234 A | * | 5/1976 | Mulvey | B64D 1/22 |
| | | | | 244/137.1 |
| 5,499,785 A | * | 3/1996 | Roberts | B64D 1/12 |
| | | | | 244/3 |
| 9,174,733 B1 | * | 11/2015 | Burgess | B64D 1/12 |
| 9,580,173 B1 | * | 2/2017 | Burgess | G05D 1/102 |
| 9,928,749 B2 | | 3/2018 | Gil et al. | |
| 10,035,623 B1 | | 7/2018 | Prager et al. | |
| 10,308,360 B2 | | 6/2019 | Sopper et al. | |
| 10,618,655 B2 | | 4/2020 | Rinaldi et al. | |
| 2019/0308750 A1 | * | 10/2019 | Duval | B64D 1/02 |
| 2019/0315512 A1 | | 10/2019 | Smith et al. | |
| 2020/0172241 A1 | | 6/2020 | Green et al. | |

FOREIGN PATENT DOCUMENTS

| | | |
|---|---|---|
| WO | 2019/210407 A1 | 11/2019 |
| WO | 2020/157490 A1 | 8/2020 |

* cited by examiner

210/ 215

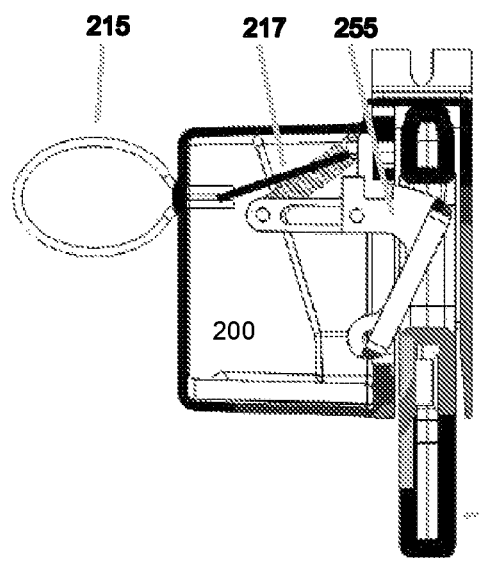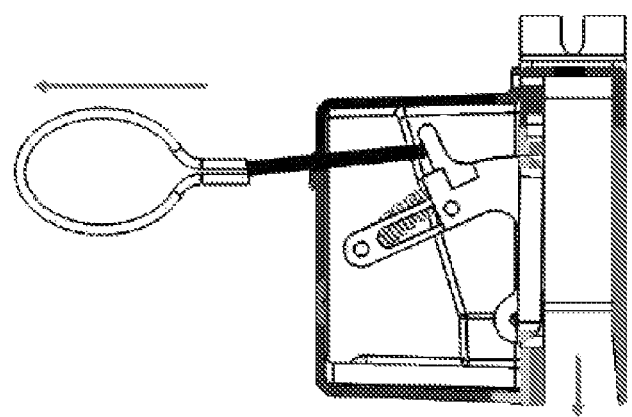
Figure 5A
Figure 5B

UNMANNED AIRCRAFT PAYLOAD SYSTEM AND METHOD

FIELD

This disclosure relates to a payload and control and management system for unmanned aircraft.

BACKGROUND

Aircraft may support various payloads for transporting items during flight. The payloads may vary in size, shape and weight. Payloads are releasably attached to the aircraft so the payload can be transported. Unmanned aircraft, such as drones, may also carry payloads.

It is therefore desirable to have an automated flexible system for managing payloads.

SUMMARY

In an aspect, a method of transporting a payload using an unmanned aircraft having a payload attachment device. The method including positioning a payload box beneath the aircraft and aligning each of one or more payload box handles with receivers of corresponding one or more payload attachment devices. Then, receiving each payload handle by the receivers of the corresponding one or more payload attachment devices at a first location. The method then including releasable engaging each payload handle with a biased latch passing into an opening in the payload handle, by the corresponding payload attachment device to support the payload by the payload attachment device. Once engaged, the method includes flying the aircraft to a second location with the payload box and disengaging each payload handle by forcing the latch against the bias to release the payload handle from the receiver at the second location.

The method further comprising communicating telemetry data and electrical power from the payload through a first electrical connection between the payload handle and the payload attachment device, though a second electrical connection between the payload attachment device to the aircraft. In some embodiments, wireless communication may be used for telemetry data from the payload to aircraft command and control system.

A further aspect includes a payload attachment device for an unmanned aircraft for supporting a payload having a payload handle, the payload attachment device. The payload attachment device including a receiver for receiving the payload handle and a releasable latch in the receiver having an engaged position and disengaged position, the latched biased to the engaged position restraining a payload handle. The payload attachment device includes a manual release connected to the latch for overcoming the bias and moving the cam to the disengaged position and an automated release connected to the latch for overcoming the bias and moving the cam to the disengaged position, the automated release connected to a controller of the unmanned aircraft, such as onboard control system.

In a further aspect, the payload attachment device further comprising a disconnectable electrical communication connection between the payload attachment device and the payload handle when the payload handle is restrained.

In a further aspect, the payload attachment device receives payload telemetry data from the payload using the disconnectable electrical communication connection.

BRIEF DESCRIPTION OF THE DRAWINGS

In drawings which illustrate by way of example only a preferred embodiment of the disclosure.

FIG. 5 is a cross-section of a payload attachment device showing a manual release of a payload handle.

DETAILED DESCRIPTION

Figure 1A:
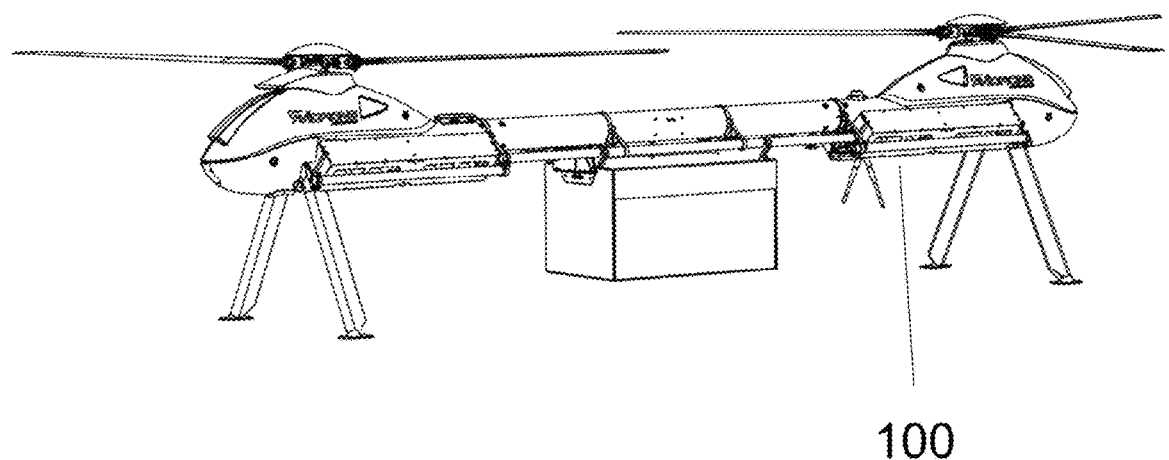
FIG. 1A is a perspective view of an unmanned aircraft with a payload system.

An aircraft 100 may be an unmanned aircraft drone, such as described in the applicant's patent application PCT/CA2019/050560 which is incorporated by reference.

Attached to the aircraft 100 are one or more payload attachment devices 200. Each payload attachment device 200 may be substantially similar and adapted to releasable receive a payload handle 305. The payload handle is attached to or integrated with a payload, such as a payload box 300. In this way, the aircraft 100 may be loaded with a payload by receiving a payload handle in the payload attachment device, transport a payload and then release the payload when the payload attachment device releases the payload handle at a destination.

With reference to FIG. 1A, an aircraft 100 may comprise one or more rotors, control system(s), and a fuselage. The one or more payload attachment devices 200 may be affixed to the fuselage, body structure or wings either directly or indirectly. The one or more payload attachment devices 200 may be affixed to one or more structural tubes 150. The payload attachment device 200 may be integrated with the fuselage or other components of the aircraft with or without being affixed to a structural tube, or may be a separate device affixed to the aircraft in a different manner. The payload attachment device may be attached externally, or removeably attached to a mounting point.

Figure 1B:
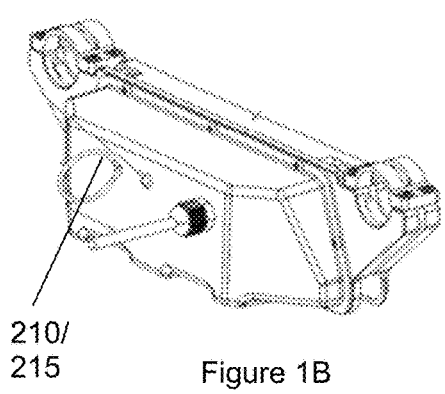
FIG. 1B is a perspective view of a first side of payload attachment device.
Figure 1C:
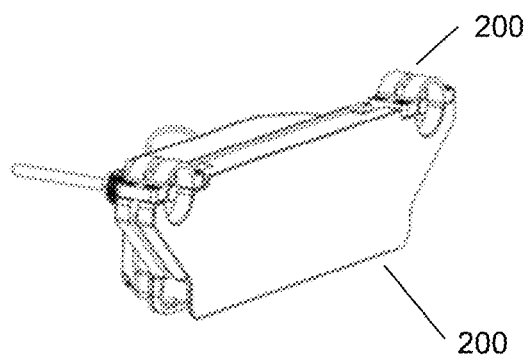
FIG. 1C is a perspective view of a second side of payload attachment device.

With reference to FIGS. 1B and 1C, the payload attachment device 200 may be a separate device. The payload attachment device 200 may comprise one or more mounts 205 for affixing the payload attachment device to the aircraft. The mounts 205 may comprise rings for capturing mounts on the fuselage such as structural tubes. There are preferably at least two mounts 205 to reduce the possibility of the payload attachment device 200 moving independently of the fuselage during operation.

The aircraft of a variety of sizes may be compatible with a scaled version of the payload attachment device. A large aircraft may have a correspondingly large one or more payload attachment devices and support a large payload. Similarly, a small aircraft may have a smaller payload attachment device and smaller payload. If the payload is sufficiently large, it may be compatible with suitable mechanical devices for moving the payload on the ground, such as compatibility with forklifts, lifts or conveyors, in addition to, or instead of human operators.

The payload attachment device 200 may include a housing to protect the interior components from the elements, such as water, dust and other elements. The housing may be made of plastic, metal or other suitable material, preferably light to reduce extraneous mass for the aircraft to lift. The payload attachment device 200 contains a payload handle receiver 250 which is preferably a slot in the bottom of the payload attachment device.

The payload attachment device 200 may include a manual release 210. The manual release may contain a loop 215 for ease of gripping by a human fingers. The loop may be of metal, rubber, plastic, fabric or other suitable material. The manual release 210 attaches to the manual release mechanism described below. The manual release 210 may be used by a human to release the payload handle from the payload attachment device 200. This may be done while the aircraft is powered or unpowered.

The payload attachment device 200 may include an electrical connector 220 for connecting the payload attachment device to the aircraft 100. The electrical connector 220 may include power and single direction or bi-directional communications. The electrical connector 220 may facilitate the aircraft 100, such using a control system, to operate the payload attachment device, such as by causing it to release a payload. The payload attachment device may provide signals to the aircraft, such as whether it is supporting a payload, the weight of the payload, and other characteristics, telemetry or configuration of the payload. Electrical connector 220 may be a cable exiting the housing of the payload attachment device 200, but the electrical connector 220 may be wired or wireless. The electrical connector 220 may be integrated with the mount 205.

The payload attachment device 200 may include one or more indicators 230 on the housing. The indicators may include LEDs displaying one or more colours, a display or touch screen. The indicators 230 may display the status or other information about the payload attachment device 200 such as whether the device is operating, the status of the payload, the weight of the payload or other information.

With reference to FIGS. 2A, 2B, 2C and 2D, a payload may comprise a payload box 300. The payload may comprise one or more payload handles 305. If the payload is a payload box, the box may comprise two payload handles 305a, 305b. The payload handles may be suitable for carrying by a hand by a human, with reference to FIG. 3A. The payload handle may be of suitable size that for fingers of a human hand may pass through a handle opening 310. In this way, the box may be readily carried or moved by a human.

Figure 2A:
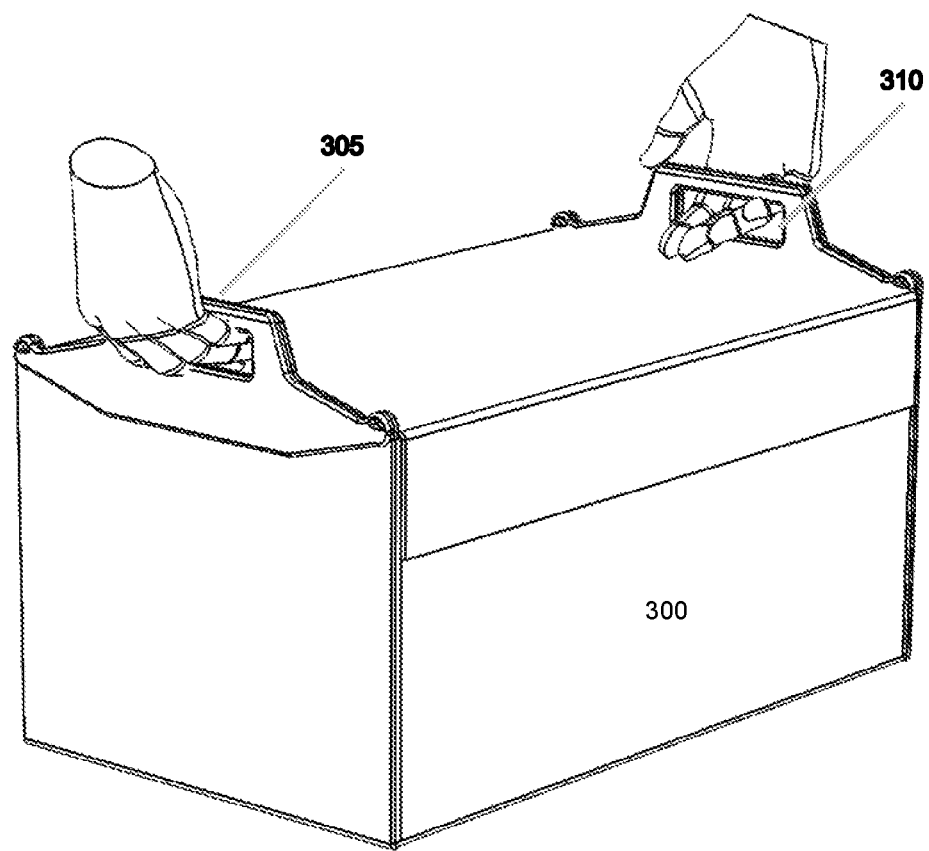
FIG. 2A is a perspective view of a payload box with payload handles being used by a human operator.
Figure 2B:
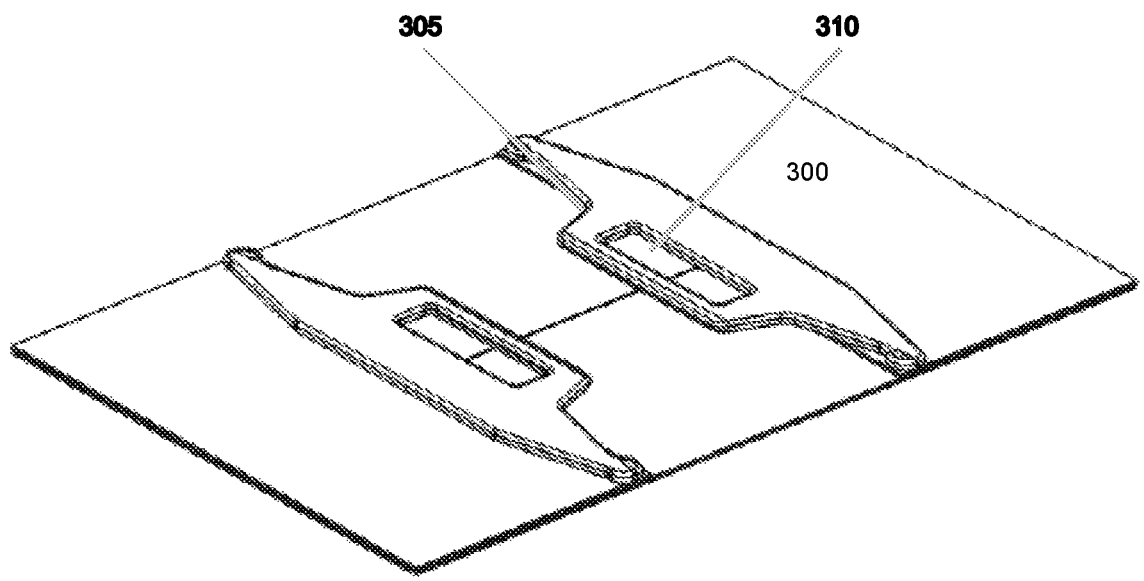
FIG. 2B is a perspective view of a payload box with payload handles flat packed.
Figure 2C:
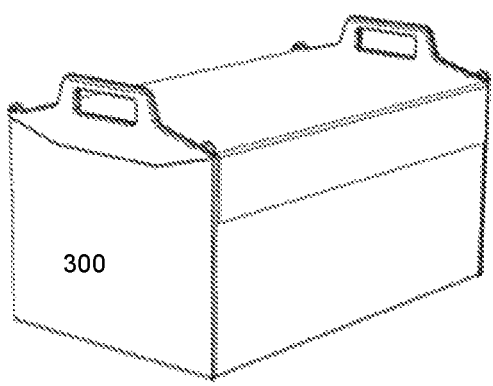
FIG. 2C is a perspective view of a closed payload box with payload handles.
Figure 2D:
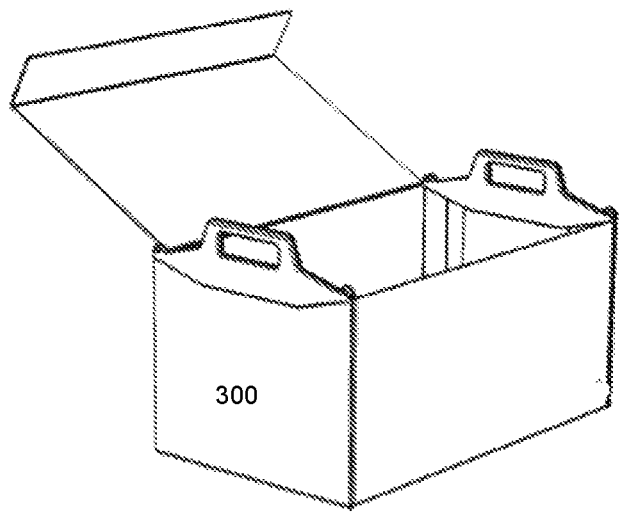
FIG. 2D is a perspective view of an open payload box with payload handles.

The payload box may comprise a floor, four walls and a top to contain a cavity inside the box. The cavity inside may be used to contain a suitable payload. With reference to FIGS. 2C and 2D, the payload box may have an openable top to access the cavity. In this way, a suitable payload may be placed within the payload box. The payload box may be reusable with a suitable payload removed and replaced or a different payload placed in the box.

The payload box may contain security features such as active location tracking by way of powered radio frequency device (RF), GPS device, as well locks either physical or digital to control access to the contents. In this way a box could be delivered to a destination and only the authorized person may access the box, or the identity of the person who accesses the box be recorded. The payload may include a tracker or beacon such using GPS or the wireless network so that the box's location can be determined remotely.

The payload box may be made from a suitable materials such as metal, carbon fibre, plastic, corrugated plastic or cardboard. The material is preferably lightweight and has sufficient structural strength to support the suitable payload. The material is also preferably able to withstand rain, water or other elements the aircraft may encounter.

The payload box may be collapsible to be substantially flatten state. In a flat or collapsed state, it may be easier to store when not use, such as being shipped to its intended use with an aircraft. Prior to being used with an aircraft, the payload box in the flat state may be expanded to its operating state. The payload box may be stackable with suitable receivers on the bottom of the payload box to receiving a handle of a similar payload box. The payload box receiver may provide similar functionality as the payload attachment device including communication of power and signals, be releasable both manually and automatically. Alternatively, the payload box receiver may only be a suitable cavity for the payload handle of a lower box so that payload boxes may be stacked while on the ground.

As described below, the payload handles 305 are receivable by the payload attachment device. A payload attachment device may be able to receive payload boxes of different materials and shapes as long the payload handles are suitable for being received by the payload attachment device. Although primarily described in this description as being a payload box, other variations in shape, orientation and size of compatible payloads are contemplated.

A payload may be modular in type from the aircraft, and incorporate the payload handles compatible with the payload attachment device and be specialized such as search lights, cameras, emergency equipment, military equipment, sensors, cargo delivery cartons, winch, robotic arms, or other equipment. In this way, the payload can be easily and quickly connected and removed from the aircraft using the payload attachment device and easily swapped out for either a general purpose box, replacement equipment if it is worn out or damaged, or different equipment. The aircraft itself may therefore be general purpose with the payload being selected and attached using the payload attachment devices for a particular mission. The electrical connection 320 described below, may allow the payload, particularly if it is a specialized payload, to interface with the aircraft and flight or mission control to affect operation of the aircraft for a particular mission. The payload may include a strobe or beacon to make locating the payload easier during flight and after it is dropped off by the aircraft.

Figure 10A:
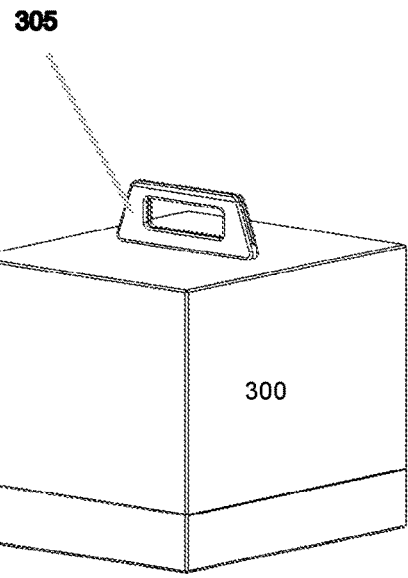
FIGS. 10A, 10B, 10C, 10D, 10E are perspective view of some payloads options using one or more payload handles.
Figure 10B:
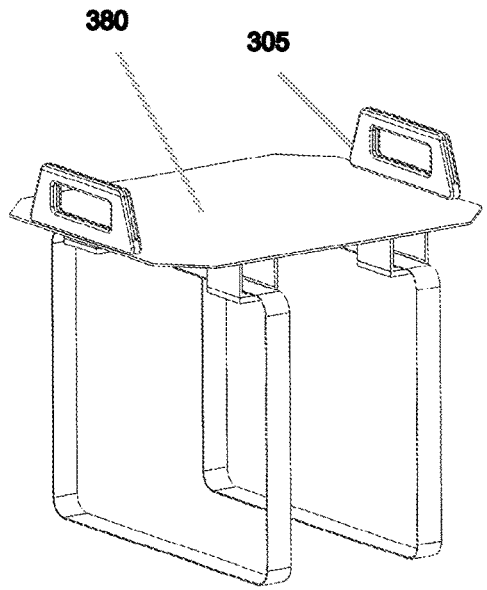
Figure 10C:
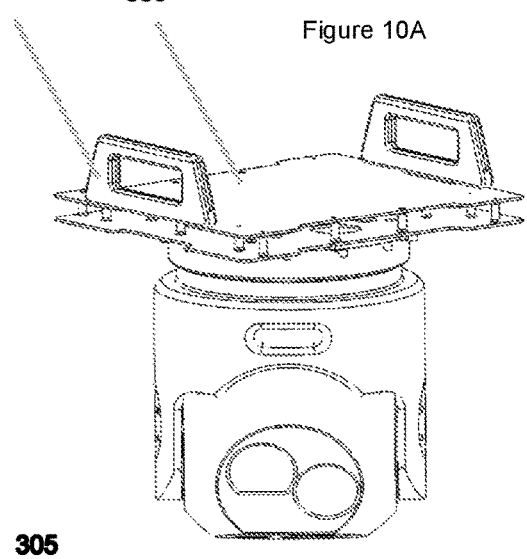
Figure 10D:
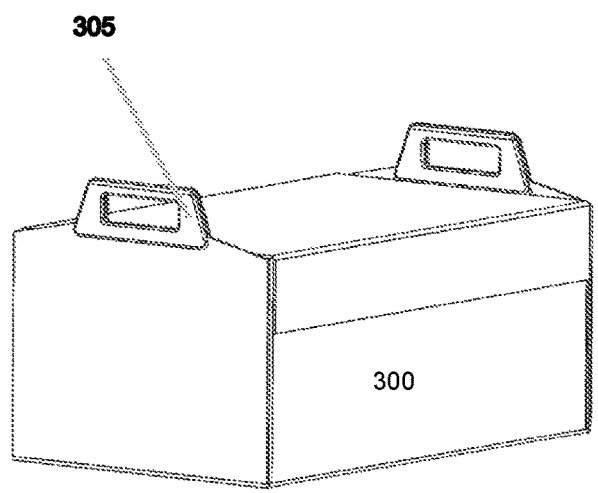
Figure 15:
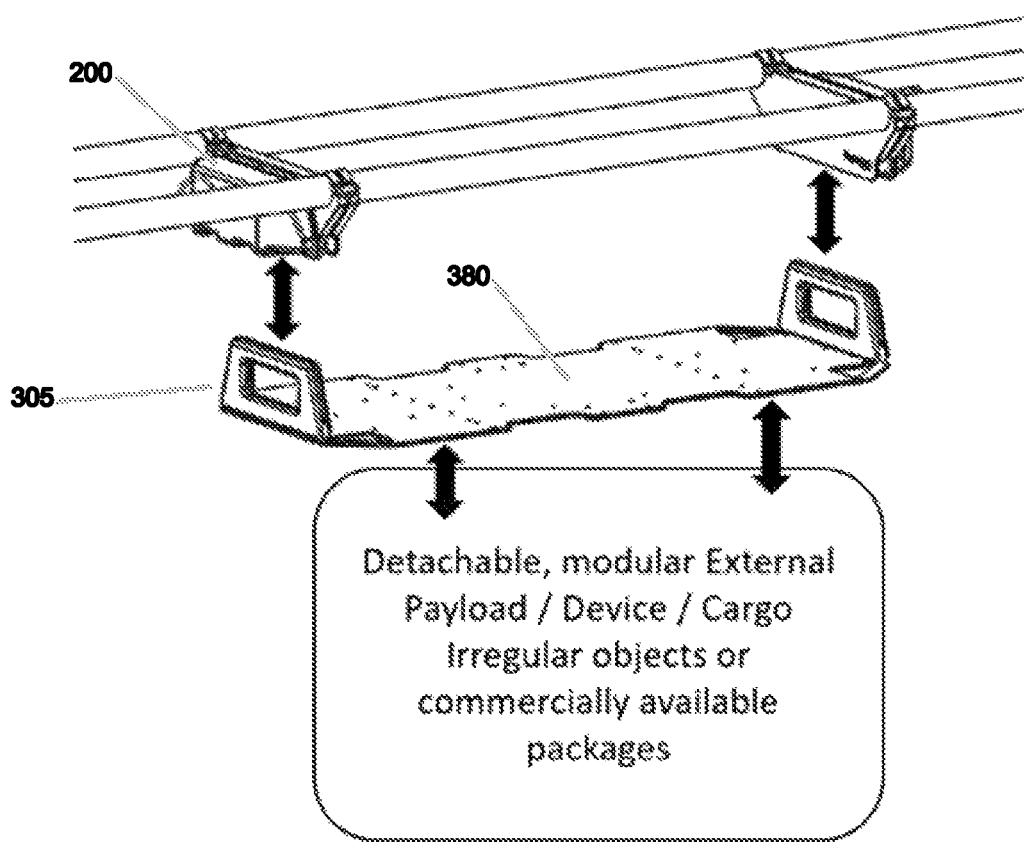
FIG. 15 is a perspective view of a payload plate co-operable with payload attachment devices.

The payload may comprise a rigid adapter plate 380. With reference to FIG. 15, payload handles may be integrated with an adapter plate. The adapter plate may be a rigid plate with a payload handle at each end. The adapter plate may include mounting holes or other mounting hardware in or through the plate. With reference to FIGS. 10B and 10C, equipment, tools, boxes, or other hardware may be mounted to the adapter plate using the mounting hardware, straps, tape or other similar means. A parachute may also be affixed to the adapter plate or winch device to lower and release a payload automatically from the aircraft when commanded. Once the hardware is attached to the adapter plate it may be operated with the aircraft 100 and the payload attachment device. The adapter plate may include power and communications connections so that telemetry data may communicated from a device attached to the adapter plate through the payload attachment device to the aircraft control system and/or through wireless link to a ground control station or remote cloud data collection and distribution system. Control data may be communicated over a reverse path such that hardware attached to the adapter plate may be controlled from the ground or the aircraft.

Figure 10E:
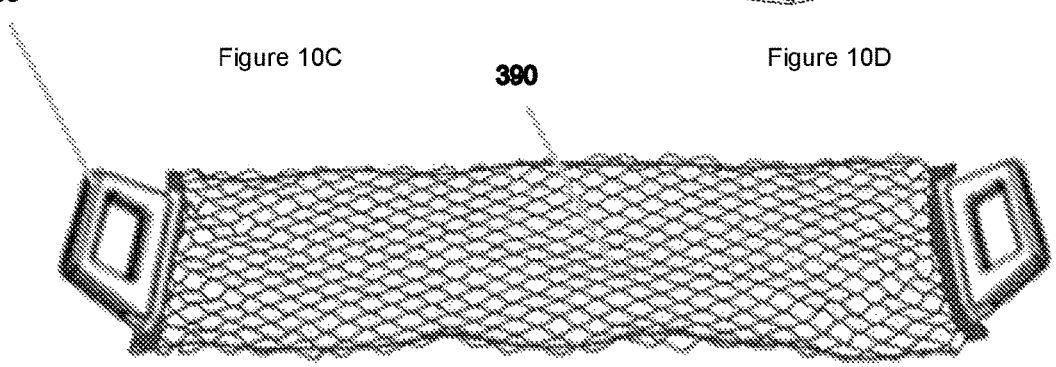

With reference to FIGS. 10A, 10B, 10C, 10D, and 10E, the payload handles may be components of a variety of payloads. The payload may be generally a container, as described in more detail in this description, with one handle, with reference to FIG. 10A or more than one handle, with reference to FIG. 10D. With reference to FIG. 10E, the payload may comprise a net 390 slung between or below one or more payload handles. Loads may be placed in or within a net or sling to be supported by one or more payload handles when received in the payload attachment devices.

Figure 3A:
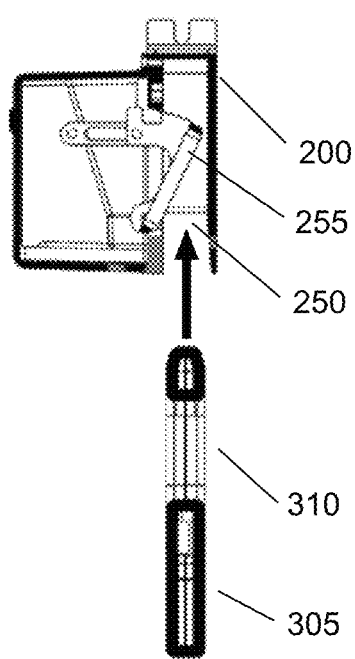
FIGS. 3A, 3B and 3C are cross-sections of a payload attachment device with a payload handle being inserted into payload attachment device.
Figure 3B:
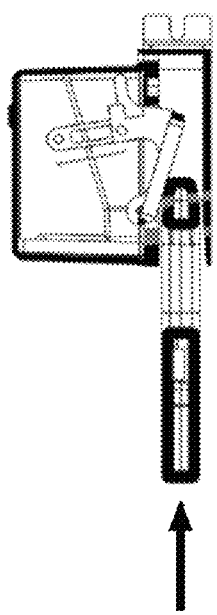
Figure 3C:
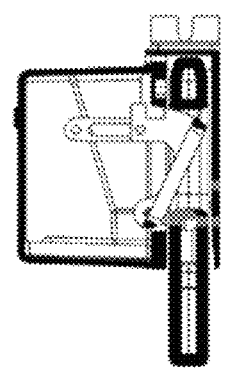

With reference to FIGS. 3A, 3B and 3C, a payload handle 305 may be received by the payload attachment device 200. The payload handle receiver 250 may be a slot or opening on the bottom of the payload attachment device 200. The payload attachment device 200 may contain a latch 255 biased to block the receiver 250. A payload handle entering the receiver contacts the ramp of the latch and counters the bias allowing the handle to enter the receiver. The latch may comprise a cam, such as an over centre cam. The latch or cam permit the payload handle to be received and supported without requiring electrical power but only allow the payload to be removed when the latch is released manually or automatically.

When the payload handle is substantially all the way into the receiver 250, the latch 255 may be biased into the payload handle opening 310. Any payload handle for a particular design of payload attachment device have the payload handle opening 310 in a suitable location for interaction with the latch. Preferably the payload handle is suitable for receiving a human fingers/hand for ease of handling the payload box by a human operator.

With the latch biased into the payload handle opening, the payload handle is sufficiently locked into the payload attachment device. The payload handle cannot be removed from the receiver without the latch being released. In this way, the payload, such as the payload box, is not able to fall during operations, such as flight. With disturbances during flight, such as vibration of the mechanical elements from rotors or other components, and air turbulences, it is not desirable that the payload attachment device disengage the payload handle accidentally or unexpectedly. It is therefore important that the latch is biased with sufficient force to retain the payload handle within the receiver. The latch surface may be oriented such the force of gravity on the payload, tending to extract the payload handle from the receiver is not translated into a significant lateral force against the bias. This may be done by orienting the surface of the latch on which the payload handle rests when the latch is engaged with the payload opening is substantially horizontal, to reduce the lateral forces.

Figure 4:
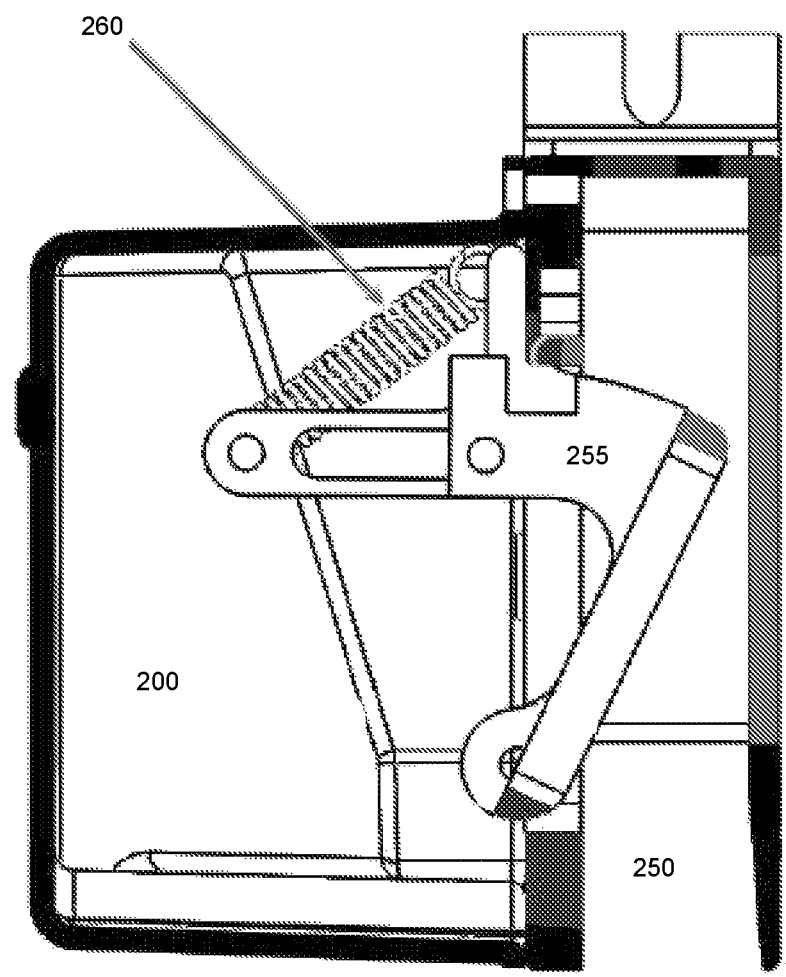
FIG. 4 is a cross-section of a payload attachment device.

With reference to FIG. 4, one or more coil springs 260 within the payload attachment device may provide the bias to the latch, forcing the latch into the receiver of the payload attachment device. The bias may be provided by alternative means, such as a leaf spring, or flexing of a latch, or complying tensioning device or material. In this way, the payload handle may be inserted into the receiver whether the payload attachment device has power or not, and the latch will retain the payload handle.

The payload attachment device may receive and retain the payload handle without requiring electrical power. In this way, it may retain the payload handle, and hence the payload, even when powered off, such as while on the ground. In addition, by not requiring power to retain the payload handle while powered, less power may be needed during operation. In other words, electrical power may not be required to simply retain the payload in place. By not requiring power to receive a payload handle, the aircraft may be powered off while a human operator loads the payload on the aircraft, reducing risk to the human operator from the aircraft.

With reference to FIGS. 5A and 5B, the manual release mechanism may include a linkage 217 between the release loop 215 and the latch 255. An external force on the manual release loop 215 will tend to counter the bias on the latch 255. If the force overcomes the latch bias, such that the latch is retracted, it will disengage the payload handle. Operating the manual release will disengage the payload handle and the payload handle can be removed from the payload attachment device. The manual release can be used whether the payload attachment device has power not. A human operator may use the manual release to remove a payload from the aircraft equipped with a payload attachment device such as when the aircraft is not operating.

Figure 6:
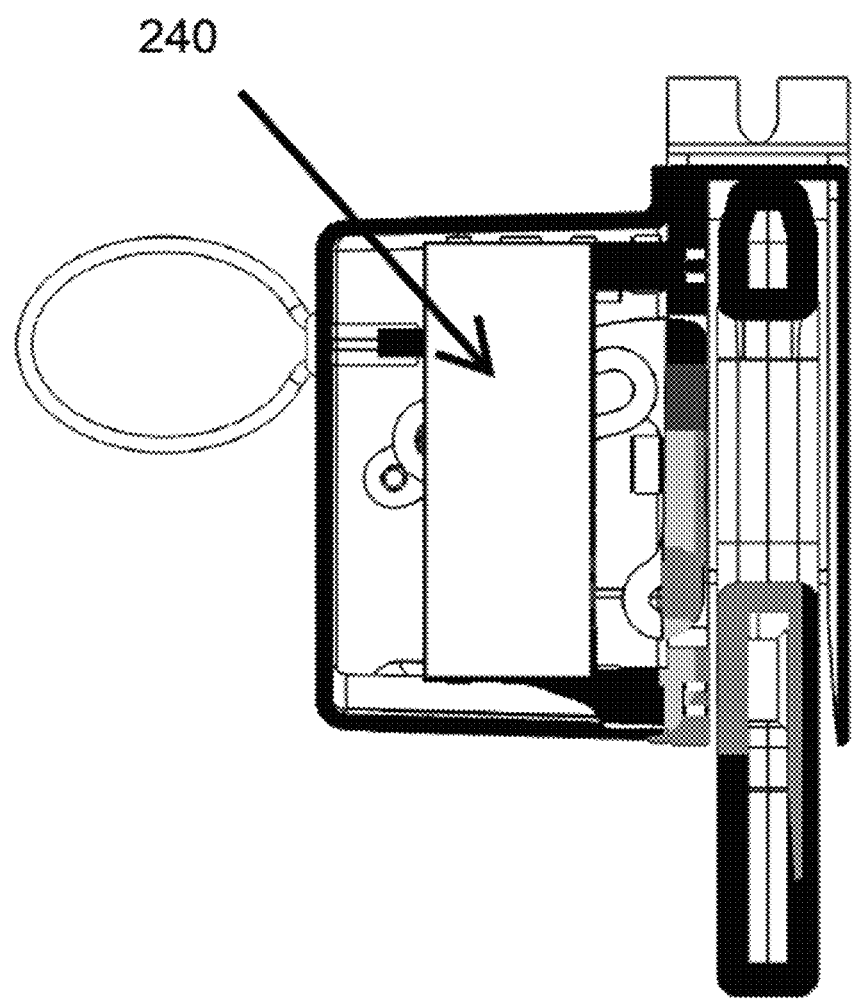
FIG. 6 is a cross-section of a payload attachment device showing a servo release.
Figures 11A, 11B:
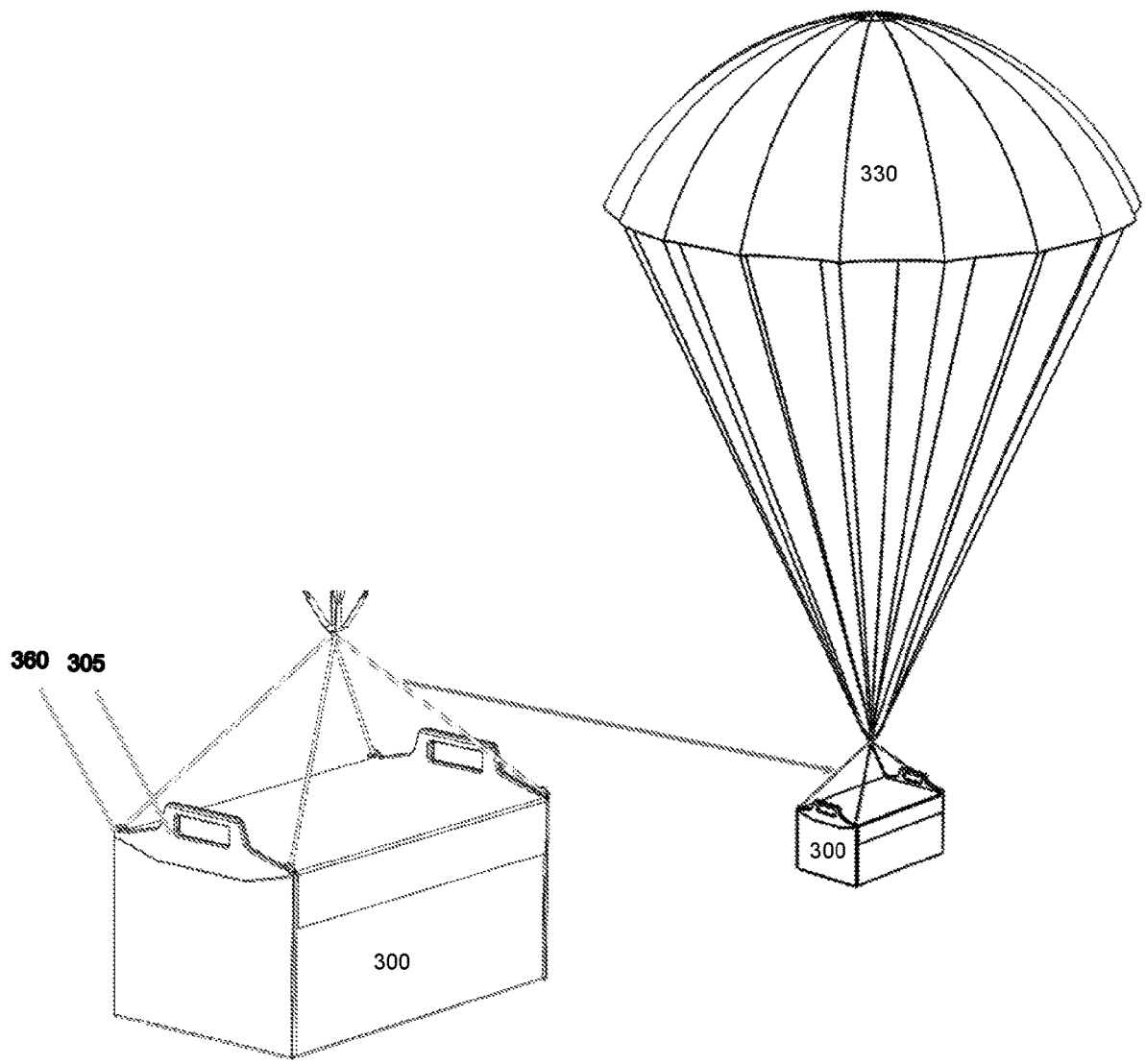
FIGS. 11A and 11B are perspective views of a payload box deployed with a parachute.
Figure 12:
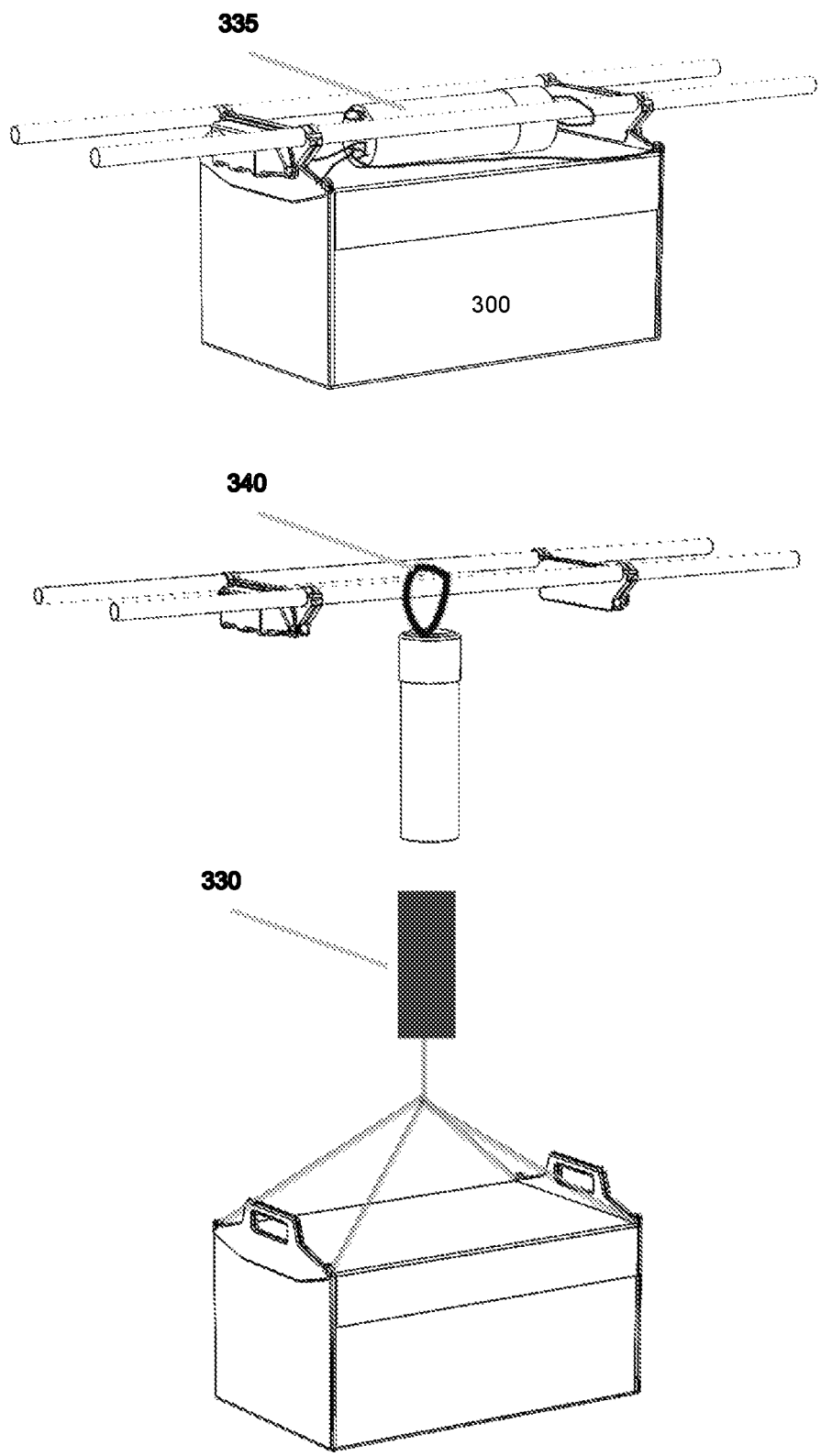
FIGS. 12A and 12B are perspective view of a payload box with a parachute prior to and after deployment.

With reference to FIG. 6, the payload attachment device may include an automated release 240. The automated release may be a servo motor, solenoid or other electromechanical device that can retract the latch in response to electrical signals. The electrical signals may originate directly or indirectly within the aircraft 100, from a control system on the aircraft, from a controller in the payload attachment device or other location. A controller, either on the aircraft or remote from the aircraft, may signal that the payload is to be released. The signal, when received at the automated release operates the electro-mechanical device to disengage the payload handle. This may be done while the aircraft is on the ground, or in flight. When on the ground the payload handle may not immediately leave the payload attachment device if it is supported by the ground or other support but may be released once the aircraft takes flight. If in the air, the payload may drop to the ground either uncontrolled or controlled, such as using a parachute (reference FIGS. 11A and 11B) or winch.

With reference to FIGS. 11A, 11B, 12A and 12B, a payload box may comprise a parachute mechanism. The parachute mechanism may be integrated with the top of the box or other component of the box such that the cavity of the box may be usable for a payload object. The parachute mechanism may be affixed to a payload box using one or more attachment points. These attachment points may be ears 360 part of the handle or integrated with the payload box. The parachute mechanism 325 may automatically release a parachute when the payload handle of the payload box is released from the payload attachment device during flight. Preferably, the parachute mechanism 325 can be reused, such as replacing or packing the parachute 330 into the parachute mechanism 325.

The parachute 330 may be packed into a parachute deployment canister, package or pouch 335. The parachute deployment canister 335 may be attached to the payload attachment device, or other component of the aircraft, with a canister attachment 340, such a rip cord. The rip cord may be a loop, or hook to attach to the payload attachment device or other component on the aircraft 100. When the payload is released by the payload attachment device(s), the parachute 330 may be extracted from the canister 335 by the pull of gravity on the payload and on the attached parachute, while the canister remains attached to the aircraft. In this way the parachute 330 may be deployed once it is released from the canister 335. Alternately, the parachute canister may be attached to the payload box, and rip cord semi-securely attached to an airframe component or hard point, such as using a hook, to release the parachute upon deployment from the aircraft. In this configuration, the payload may include the parachute components affixed to it to deploy by parachute from the aircraft.

The payload handle may communicate with an active or passive communication with the payload attachment device to indicate that the payload supports deployment by parachute. Alternatively, whether a payload box supports dropping by parachute may be indicated manually such as using an interface on the aircraft, on the payload attachment device or on an aircraft controller on the ground. It may also communicate parachute drop parameters such as minimum and maximum drop height, which may be used the payload attachment device and/or aircraft flight control system to determine when it may be safe to release the payload. Parameters may be stored on the parachute-equipped payload and communicated to the aircraft including: package weight, contents, destination, location of deployment desired, and other configuration parameters the aircraft flight control may use for flight decision making, and flight performance.

A payload box may include a payload electrical connection 320 with the payload attachment device. The payload electrical connection may utilize the electrical connector 220 to provide direct or indirect connection with the aircraft. The payload electrical connection 320 may provide power to the payload box, or power from the payload box to the aircraft via the payload attachment device. The payload electrical connection 320 may provide unidirection or bidirection communications with the payload attachment device and/or a controller on the aircraft.

The controller on the aircraft may be the autopilot for the aircraft and/or a flight control system or onboard computer. Autopilot functionality may be separate or included as part of a flight control system. Payload management may be performed by one or more modules within the aircraft or in response to signals received from a ground station, either under manual or automatic control.

Figure 16:
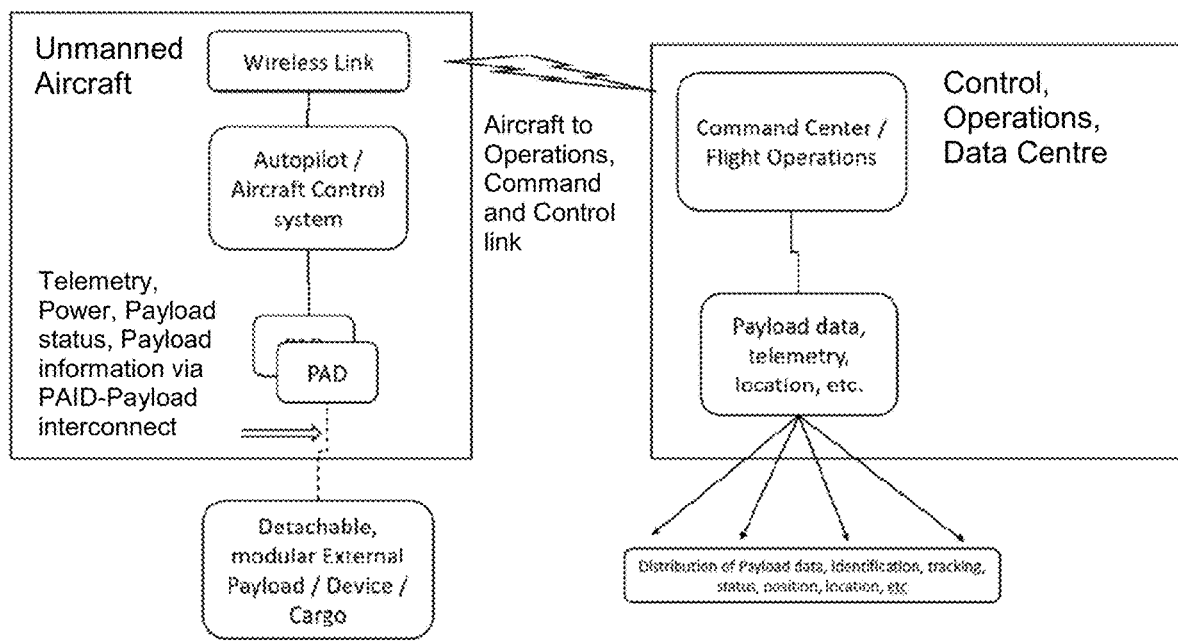
FIG. 16 is a schematic diagram of components of an aircraft and payload attachment device.

With reference to FIG. 16, communications to and from a payload may be made via connection 320 to the payload attachment device (PAD). The payload attachment device may communication via connection 220 to the aircraft, such as to the autopilot or aircraft control system. From the aircraft a wireless link may allow bidirectional communications to a ground station, which may include a command centre or flight operations. In this way telemetry data from the payload may be communicated to a ground station for processing and response. This telemetry data may include identification of the payload as well as the location for tracking of the payload.

Figure 8A:
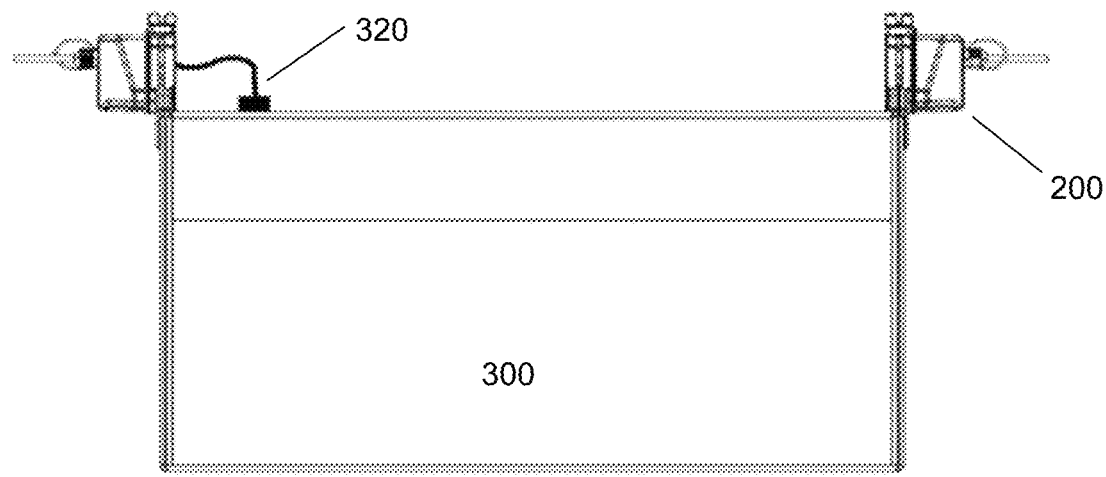
FIG. 8A is a side view of a payload box attached to two payload attachment devices with an electrical connection.
Figure 8B:
FIG. 8B is a side view of a payload box detached from two payload attachment devices with an electrical connection detached.

With reference to FIGS. 8A and 8B, a cable 320 affixed to the payload attachment device may be releasably connected to the payload box, such as the top, or sides. The cable 320 may be connect to the payload box on the handle such that it does not interfere with the payload handle being received by the payload attachment device or another part of the payload box. The cable 320 may be releasably attached to the payload such that when the payload box is released from the payload attachment device, the cable 320 detaches automatically. The cable 320 may be attached to the payload box with a suitable plug.

Alternatively, a cable may be affixed to the payload box and releasably connected to the payload attachment device, or releasably connected at both ends. The cable may be connected to the aircraft structure or fuselage rather than to the payload attachment device.

The electrical connector may be quick release such that it disconnects automatically when the payload handle is released by the payload attachment device. The cable may include alignment magnets to maintain the cable in place and alignment but allow the cable to be easily disconnected. In this way, the payload box can be released and disconnected without human intervention.

Figure 9A:
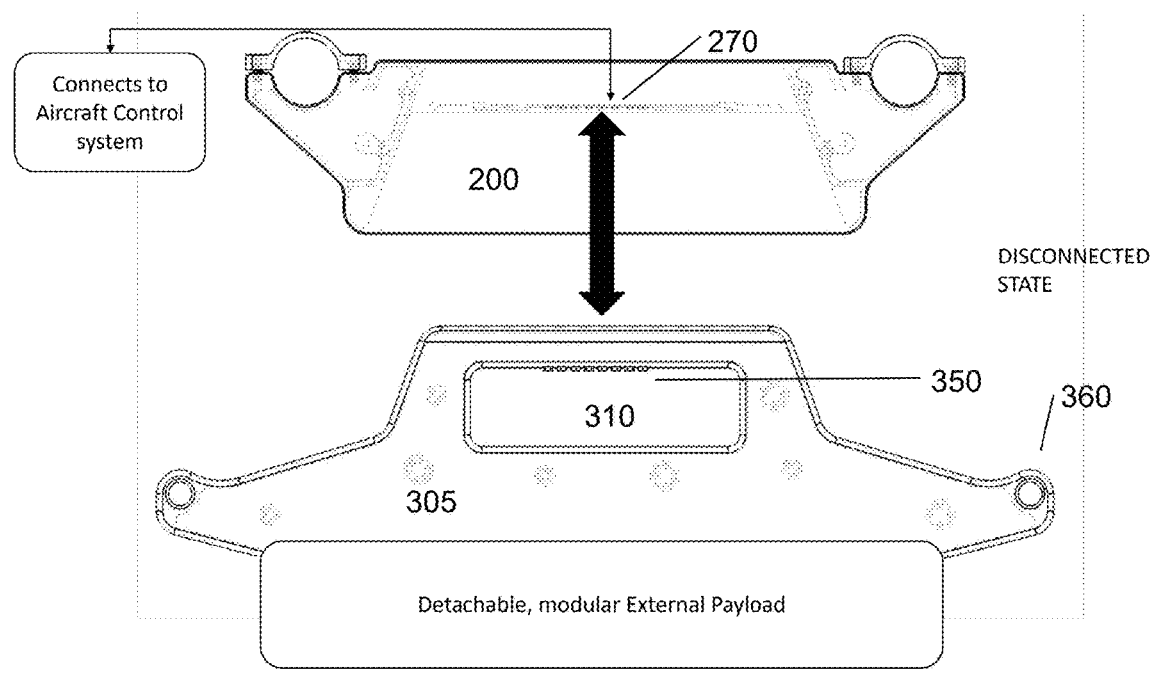
FIGS. 9A and 9B are side view partial sections of a payload handle with electrical connections to a payload attachment device.
Figure 9B:
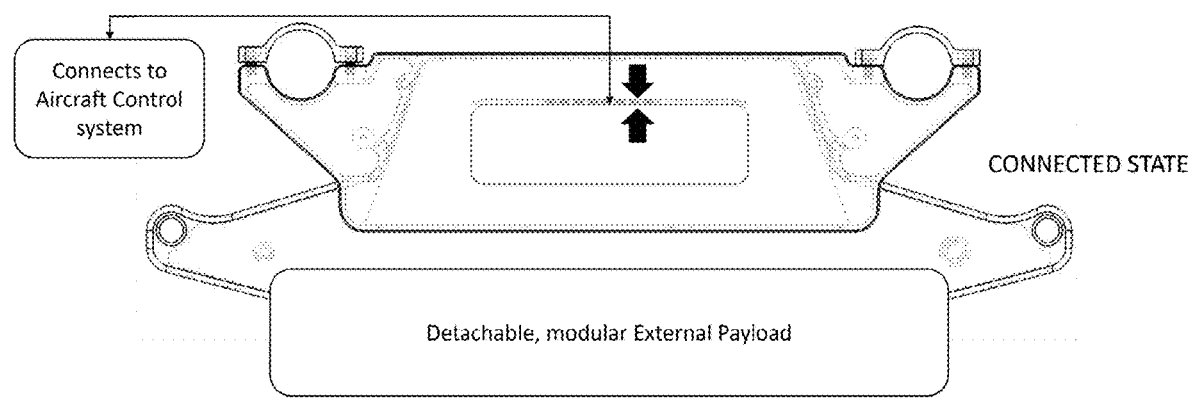

With reference to FIGS. 9A and 9B, alternatively, the payload handle 305 may include electrical contacts 350 and the payload attachment device 200 includes corresponding contacts 270 within the receiver 250. For example, electrical contacts 350 may be exposed on the top or side surfaces of the handle 305 or the top, side or bottom of the handle opening 310. Corresponding contacts 270 on the payload attachment device 200, such as the interior of the receiver or on the latch 255, may make electrical contact with the payload contacts when the payload handle is received by the payload attachment device, with reference to FIG. 9B. In this way power and/or electrical signals may pass from the payload attachment device to and from the payload box through the payload handle when the payload handle is in the payload receiver.

The payload connection 320 may be wired as described above, as referenced in FIGS. 8A, 8B and 9, or may be wireless. A wireless connection may include passive communication such as using an RFID tag on the payload with a reader on the payload attachment device, or active, such as Bluetooth or other protocol. The payload connection 320 may communication to the aircraft instead of, or in addition to via the payload attachment device.

A payload box that contains equipment may communicate configuration and telemetry, such as its status, identification, operating conditions (temperature, vibration, shock, altitude, pressure). The status may include for example temperature if the payload box contains sensitive medical supplies. The payload box may receive power such to operate sensors, cooling or heaters. The status of the payload box may be monitored by the aircraft or a ground station in communication with the aircraft such that different course of actions may be taken in response to the status. For example, if the temperature of sensitive medical supplies starts to change, the aircraft mission may be aborted or diverted.

With reference to FIGS. 7A, 7B, 7C, 7D, payload attachment devices may operate in pairs on an aircraft. The distance between the payload attachment devices and particularly the receivers correspond to the distance between the handles of the payload boxes.

Figure 7A:
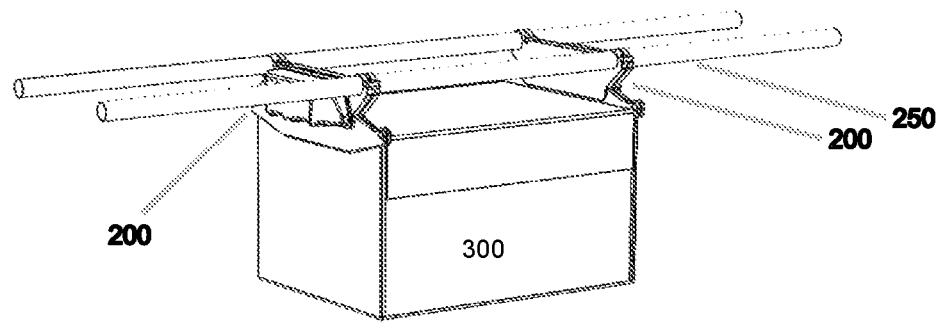
FIGS. 7A, 7B, 7C, 7D are perspective views of payload attachment devices mounted to a payload support, indicated separated from an aircraft, with a small payload box (7A), medium payload box (7B), large payload box (7C) and without a payload box (7D).
Figure 7B:
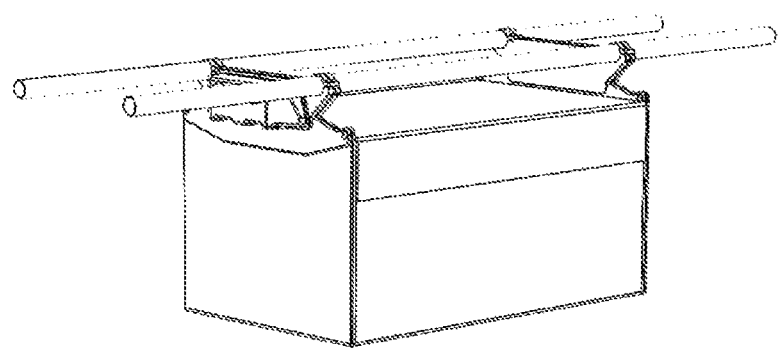
Figure 7C:
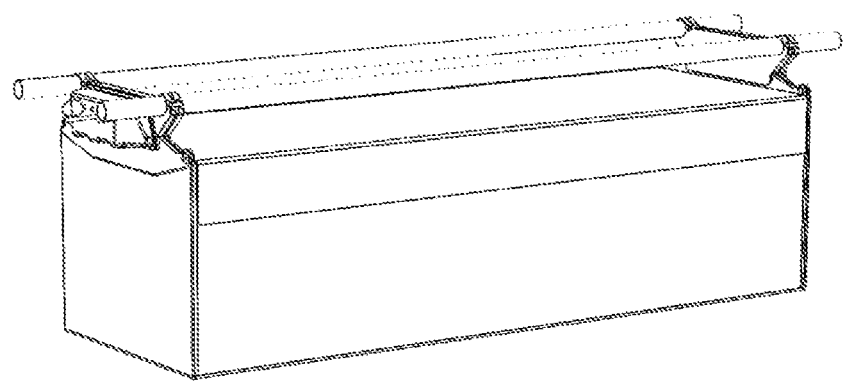
Figure 7D:
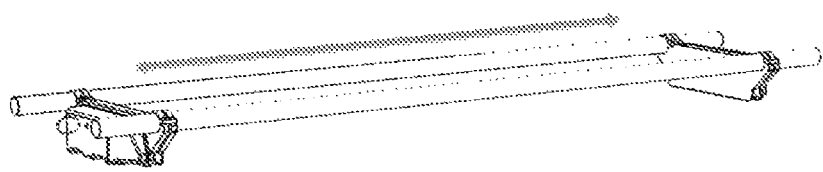

For a smaller payload box, the payload attachment devices may be placed closer together, see for reference FIG. 7A. For larger payload boxes, the payload attachment devices may be positioned farther apart, see for reference FIGS. 7B and 7C. The payload attachment devices may in a fixed location on the aircraft so that the aircraft may only transport payload boxes of a given size. Alternatively, the payload attachment devices may be an operator/user adjustable distance apart so the aircraft can carry a variety of payloads. The payload attachment devices may be mounted on structure tubing 150 such that releasing the mounts, allows the payload attachment device to be positioned on a different position along the aircraft by sliding them along the structure tubes.

Figure 14A:
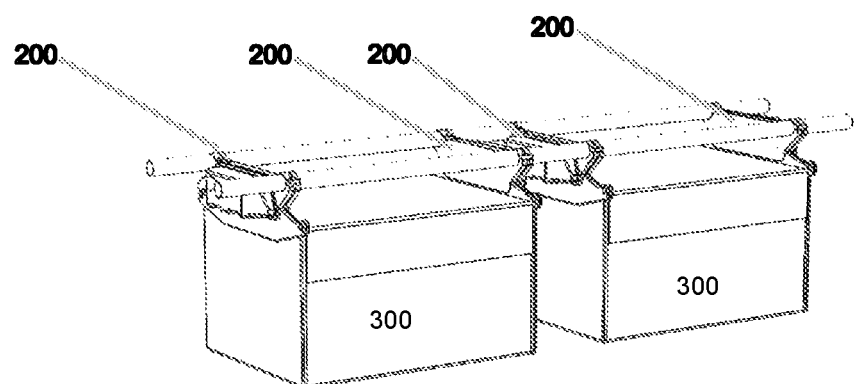
FIGS. 14A, 14B, and 14C are perspective views of a payload boxes attached to payload attachment devices mounted on payload supports on an airframe.
Figure 14B:
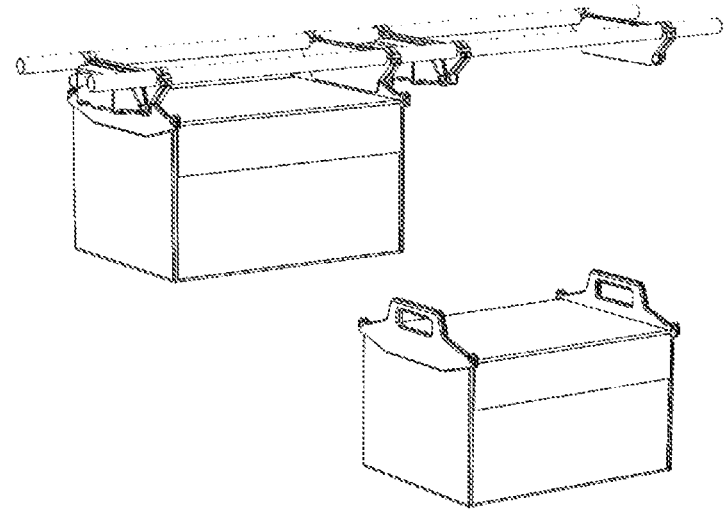
Figure 14C:
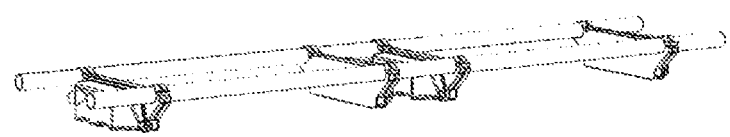
Figure 14C:
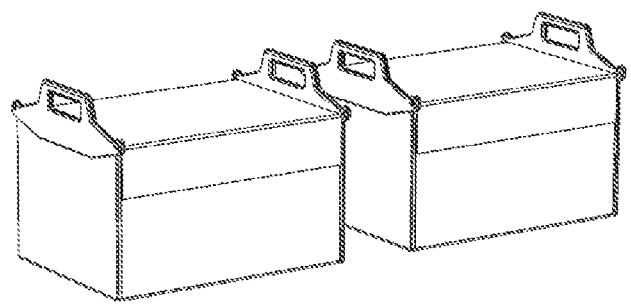

With reference to FIGS. 14A, 14B, 14C the aircraft (not shown) may comprise two secondary structural tubes. The payload attachment devices may be affixed using mounts 205 to the structural tubes. Alternatively, the aircraft may have some other arrangement of structural components on which the payload attachment devices are mounted.

An aircraft may operate with a single payload attachment device to cooperate with a payload with only a single handle.

With reference to FIGS. 14A, 14B and 14C, an aircraft may operate with more than two payload attachment devices. Payload boxes with a corresponding number of 'x' number of payload handles may be carried such as a payload with 4 handles, or more. Alternately, multiple payload boxes may be transported. In this way, one payload box may be released while other payload boxes remain attached. With reference to FIG. 14A, an aircraft may comprise four payload attachment devices operating in pairs to support two payload boxes. With reference to FIG. 14B, the payload attachment devices may release one of the payload boxes but not the other payload box. With reference to FIG. 14C, both payload boxes may be released by the payload attachment devices.

Figure 13A:
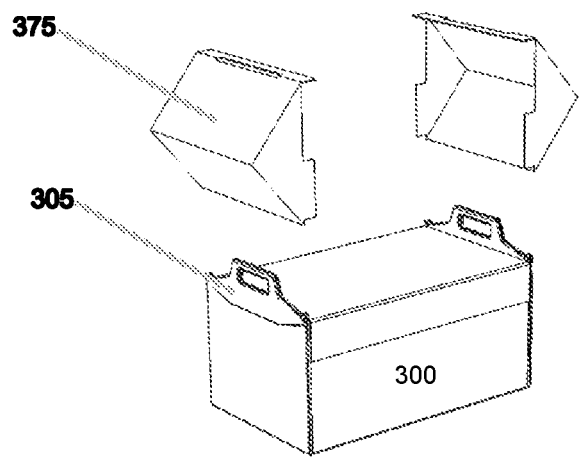
FIGS. 13A, 13B, 13C and 13D are perspective views of a payload box with aerodynamic additions.
Figure 13B:
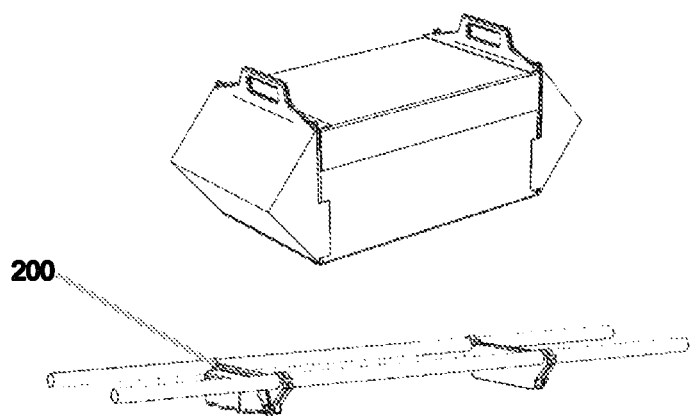
Figure 13C:
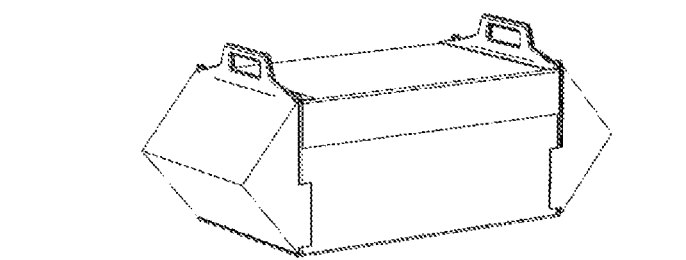
Figure 13D:
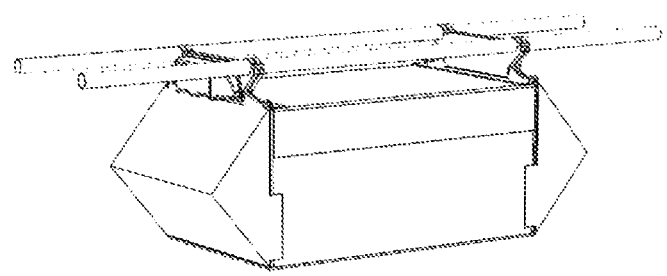

With reference to FIGS. 13A, 13B, 13C and 13D, aerodynamic add-ons 375 may be added to a payload box to increase the aerodynamic profile of the payload box. The aerodynamic add-on may be triangular as indicated in FIG. 13A or designed to complement the fuselage of the aircraft. With reference to FIGS. 13A, an aerodynamic add-on may be affixed to the payload box at each end proximate to the payload handle. The add-on 375 may be affixed using a suitable means, such as openings that slide over the payload handle, or bonded with adhesive or tapes. The aerodynamic add-ons may be added or removed from a payload box such that they can be added to any payload box of a suitable size. With reference to FIGS. 13C and 13D, payload box 300 with the aerodynamic add-ons may be mounted to the aircraft using the payload attachment devices.

The payload attachment device may include load sensors to detect the weight or mass of the payload. Strain sensors or load cells may be situated within the payload attachment device. The sensors may be placed within or proximate to the mounts, the latch or other suitable location within the device. The load sensors may communicate the weight to the aircraft such as over electrical connector 220. The aircraft may determine appropriate flight characteristics based on the load of the payload. The aircraft may modify or abort the mission, such as modifying its flight path, endurance limits or range, if the payload would be too heavy otherwise for safe operation.

The payload attachment device may include a controller such as a microprocessor and suitable memory and computer instructions. The controller may facilitate electrical communications with the aircraft and the payload. The controller may operate the indicators 230. The controller may also operate the automated release 240. The controller may send and receive signals from a base station wirelessly, such as its status or instructions to release the payload.

The payload attachment device may identify information about a payload box. For example, the payload box may include a QR code, RFID or its own controller and programmable electronic solid-state memory that provides configuration and identification information either passively or actively to the payload attachment device. The controller may facilitate receiving, storing and sharing this identification information. The identification may be communicated via electrical connector 320. The identification information may include tracking information and may include destination location. The payload attachment device may communicate the destination location to the aircraft. In this way, when a payload box is loaded on the aircraft using the payload attachment device, the aircraft may automatically determine its intended destination and a flight path. A flight controller, or other mission controller, either on the aircraft or on the ground in communication with the aircraft, may determine a flight path to facilitate deliver to the destination.

The aircraft may automatically pick up a payload by positioning the payload attachment device over the handles of a payload box situated appropriately on the ground. The payload box may contain visual or other locating indicators to assist with accurate positioning of the aircraft over the payload box. Once the payload handles are engaged with the payload attachment device, the aircraft may determine the destination for the payload box.

Using a payload attachment device, a human may load a payload box by carrying the box using the handles to an unmanned aircraft. The box may be loaded by sliding each payload box handle into the receiver of a payload attachment device. The aircraft may be powered up or not while it is being loaded. The aircraft may then transport the payload to a destination. At the destination, the payload may be automatically released using the automated release or a human operator may active the manual release on each payload attachment device to release the payload box. The payload box may then be carried using the handles away from the aircraft.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

The invention claimed is:

1. An unmanned aircraft comprising a payload attachment device supporting a payload having a payload handle, the payload attachment device comprising:
   a receiver for receiving the payload handle;
   a releasable latch in the receiver having an engaged position and disengaged position, the releasable latch biased to the engaged position restraining a payload handle;

a manual release connected to the releasable latch for overcoming the bias and moving the releasable latch to the disengaged position;

an automated release connected to the releasable latch for overcoming the bias and moving the releasable latch to the disengaged position, the automated release connected to a controller of the unmanned aircraft; and a disconnectable electrical communication connection with a first end connecting at the payload attachment device and a second end configured for connecting to the payload handle when the payload handle is restrained.

2. The payload attachment device of claim 1, wherein the disconnectable electrical communication connection comprises at least one electrical contact in the receiver, the at least one electrical contact configured for engaging electrically with at least one corresponding electrical contact on the payload handle when the payload handle is restrained.

3. The payload attachment device of claim 1, wherein the disconnectable electrical communication connection comprises a detachable cable between the payload attachment device and configured to detach from the payload handle when the releasable latch is released.

4. The payload attachment device of claim 1, further comprising a second electrical communication connection with a first end at the payload attachment device and a second end configured to connect to the unmanned aircraft.

5. The payload attachment device of claim 4, wherein the electrical communication connection is configured for communicating with a flight control system of the unmanned aircraft at the second end.

6. The payload attachment device of claim 1, wherein the payload attachment device is configured for receiving payload telemetry data from the payload using the disconnectable electrical communication connection.

7. The payload attachment device of claim 1, wherein the automated release connected to the releasable latch is configured to disengage when the unmanned aircraft reaches a destination.

* * * * *